(12) United States Patent
Trimnell

(10) Patent No.: US 10,960,948 B2
(45) Date of Patent: Mar. 30, 2021

(54) DISC BRAKE PROTECTOR

(71) Applicant: Alex Trimnell, Poole (GB)

(72) Inventor: Alex Trimnell, Poole (GB)

(*) Notice: Subject to any disclaimer, the term of this patent is extended or adjusted under 35 U.S.C. 154(b) by 0 days.

(21) Appl. No.: 16/467,861

(22) PCT Filed: Dec. 8, 2017

(86) PCT No.: PCT/GB2017/053696
§ 371 (c)(1),
(2) Date: Jun. 7, 2019

(87) PCT Pub. No.: WO2018/115813
PCT Pub. Date: Jun. 28, 2018

(65) Prior Publication Data
US 2019/0329834 A1    Oct. 31, 2019

(30) Foreign Application Priority Data
Dec. 20, 2016    (GB) .................................... 1621744

(51) Int. Cl.
*B62J 23/00*    (2006.01)
*B62L 1/00*    (2006.01)
(Continued)

(52) U.S. Cl.
CPC .............. *B62J 23/00* (2013.01); *B62L 1/00* (2013.01); *F16D 65/0081* (2013.01); *F16D 55/22* (2013.01); *F16D 2055/0037* (2013.01)

(58) Field of Classification Search
CPC .. B62L 1/00; B62L 1/005; B62J 23/00; B62K 25/02; B60B 27/0052; B60B 27/023;
(Continued)

(56) References Cited

U.S. PATENT DOCUMENTS

| 4,226,308 A | * | 10/1980 | Nishiyama | .............. | F16D 55/22 |
| | | | | | 188/218 A |
| 2009/0194378 A1 | * | 8/2009 | Sand | ....................... | F16D 55/00 |
| | | | | | 188/73.47 |

(Continued)

FOREIGN PATENT DOCUMENTS

| CN | 2521138 Y | 11/2002 |
| CN | 2712788 Y | 7/2005 |

(Continued)

OTHER PUBLICATIONS

Truchot, Alexandre, "International Search Report," prepared for PCT/GB2017/053696, dated Feb. 12, 2018, five pages.

*Primary Examiner* — Robert A. Siconolfi
*Assistant Examiner* — San M Aung
(74) *Attorney, Agent, or Firm* — Winstead PC

(57) ABSTRACT

This invention relates to a disc brake protector (1; 101) for a bicycle (200), the disc brake protector comprising (a) an inner cover (10; 110) for fitting around an axle (220) of a bicycle wheel (205, 225) between the wheel and the disc brake, the inner cover comprising a closable opening (15; 115) for insertion of the axle, and (b) an outer cover (5) which is attachable to the inner cover such that, in use, the covers enclose the disc brake. The invention also relates to a method of attaching the disc brake protector, as well as to a bicycle fitted with the disc brake protector.

17 Claims, 18 Drawing Sheets

(51) Int. Cl.
*F16D 65/00* (2006.01)
*F16D 55/22* (2006.01)
*F16D 55/00* (2006.01)

(58) Field of Classification Search
CPC .. F16D 55/22; F16D 2055/0037; F16D 65/12; F16D 65/0068; F16D 65/0081; F16D 2065/1392
USPC ........................................... 188/218 A
See application file for complete search history.

(56) References Cited

U.S. PATENT DOCUMENTS

| | | | |
|---|---|---|---|
| 2011/0108379 A1* | 5/2011 | Pahle | F16D 65/00 188/218 XL |
| 2016/0186822 A1* | 6/2016 | Koshiyama | B62K 25/02 301/6.8 |
| 2018/0050753 A1* | 2/2018 | Lee | F16N 31/006 |

FOREIGN PATENT DOCUMENTS

| | | |
|---|---|---|
| DE | 102014101207 A1 | 8/2015 |
| EP | 1029803 A2 | 8/2000 |
| GB | 2031081 A | 4/1980 |
| GB | 2477726 B | 5/2012 |
| WO | WO-2016142644 A1 | 9/2016 |

\* cited by examiner

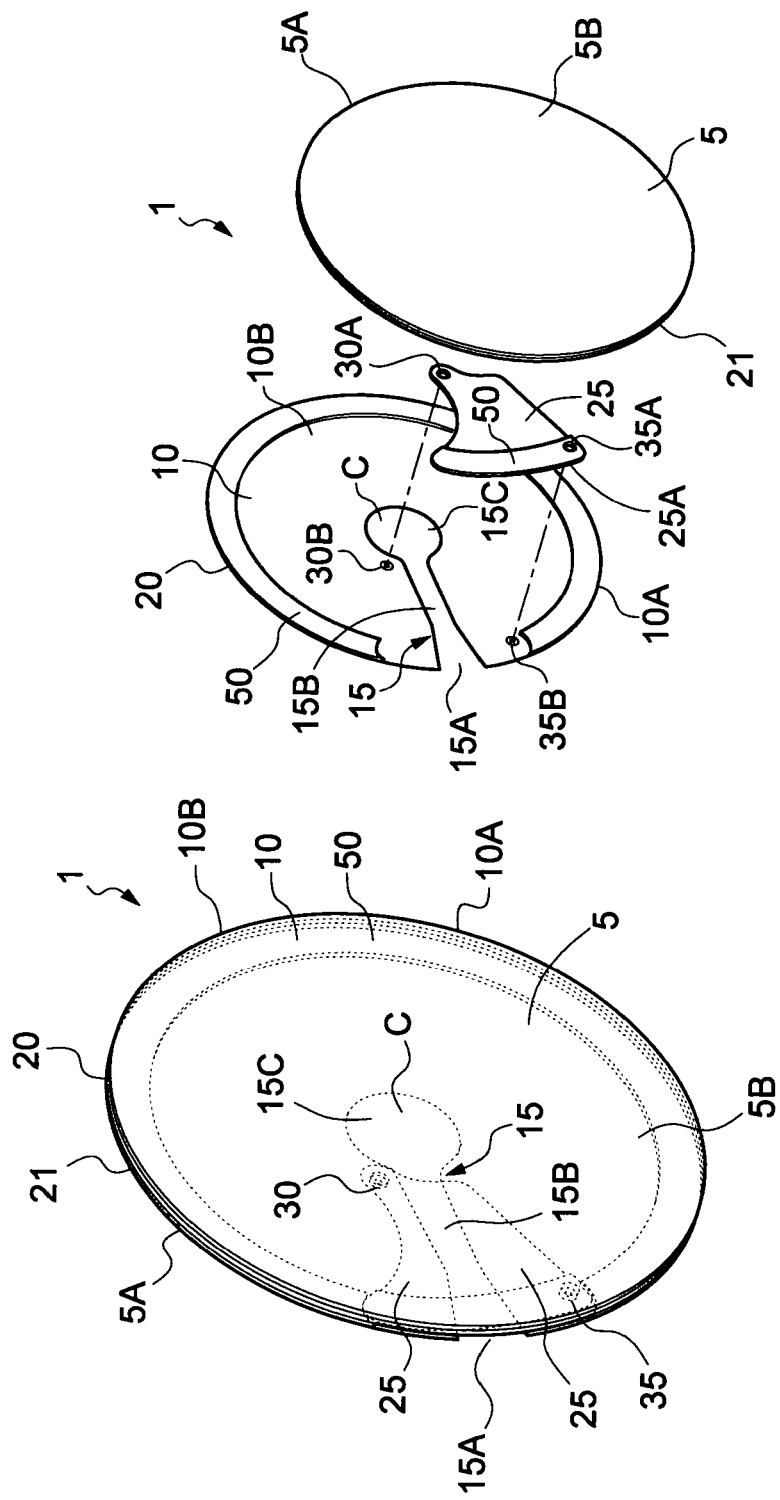

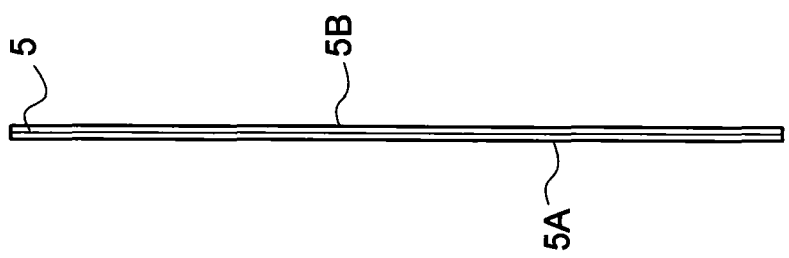
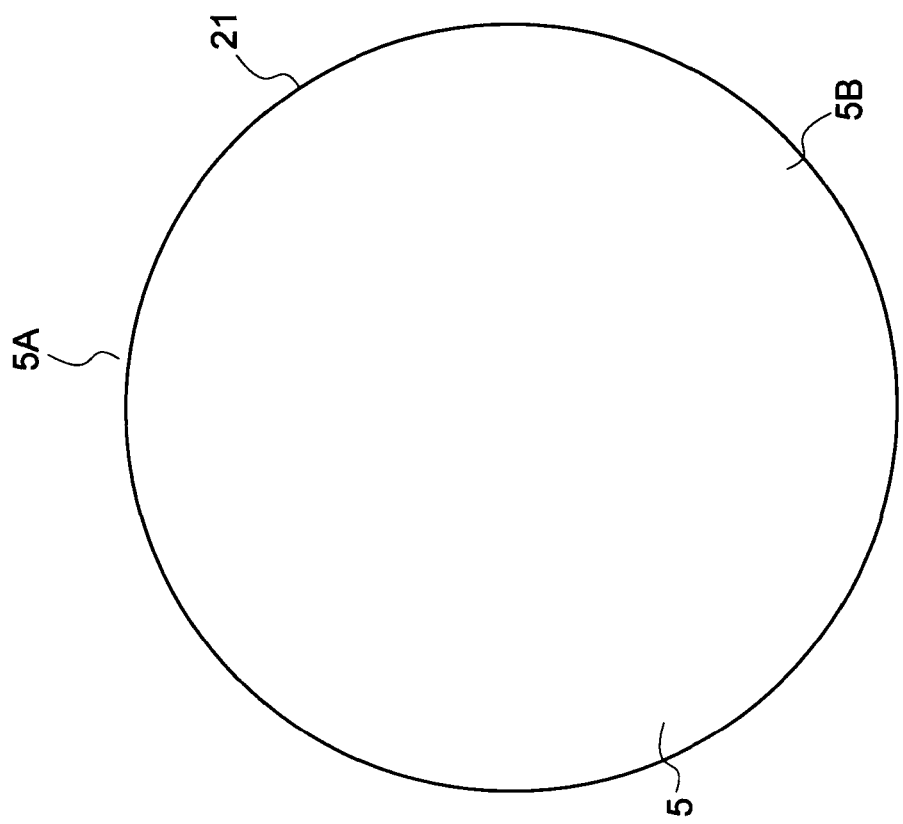

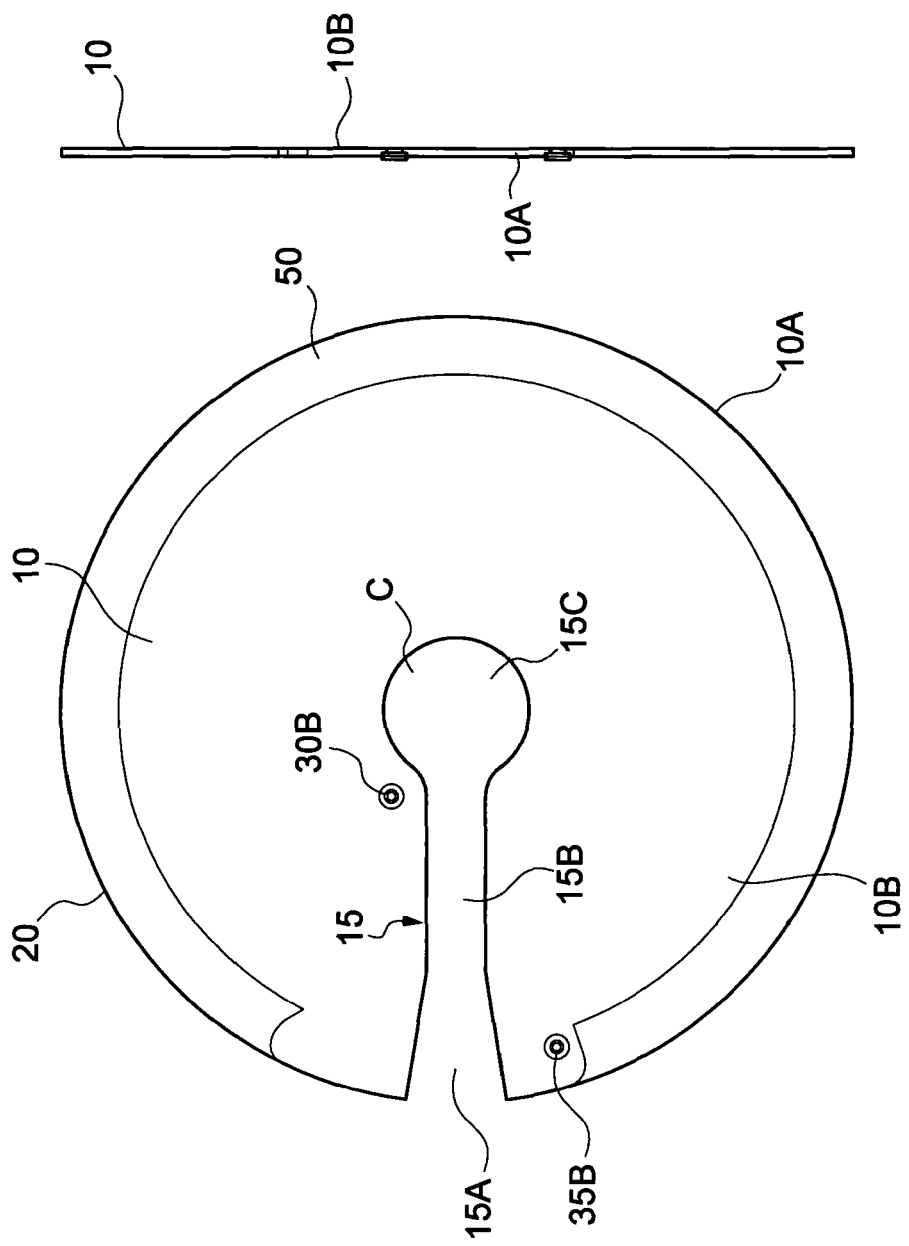

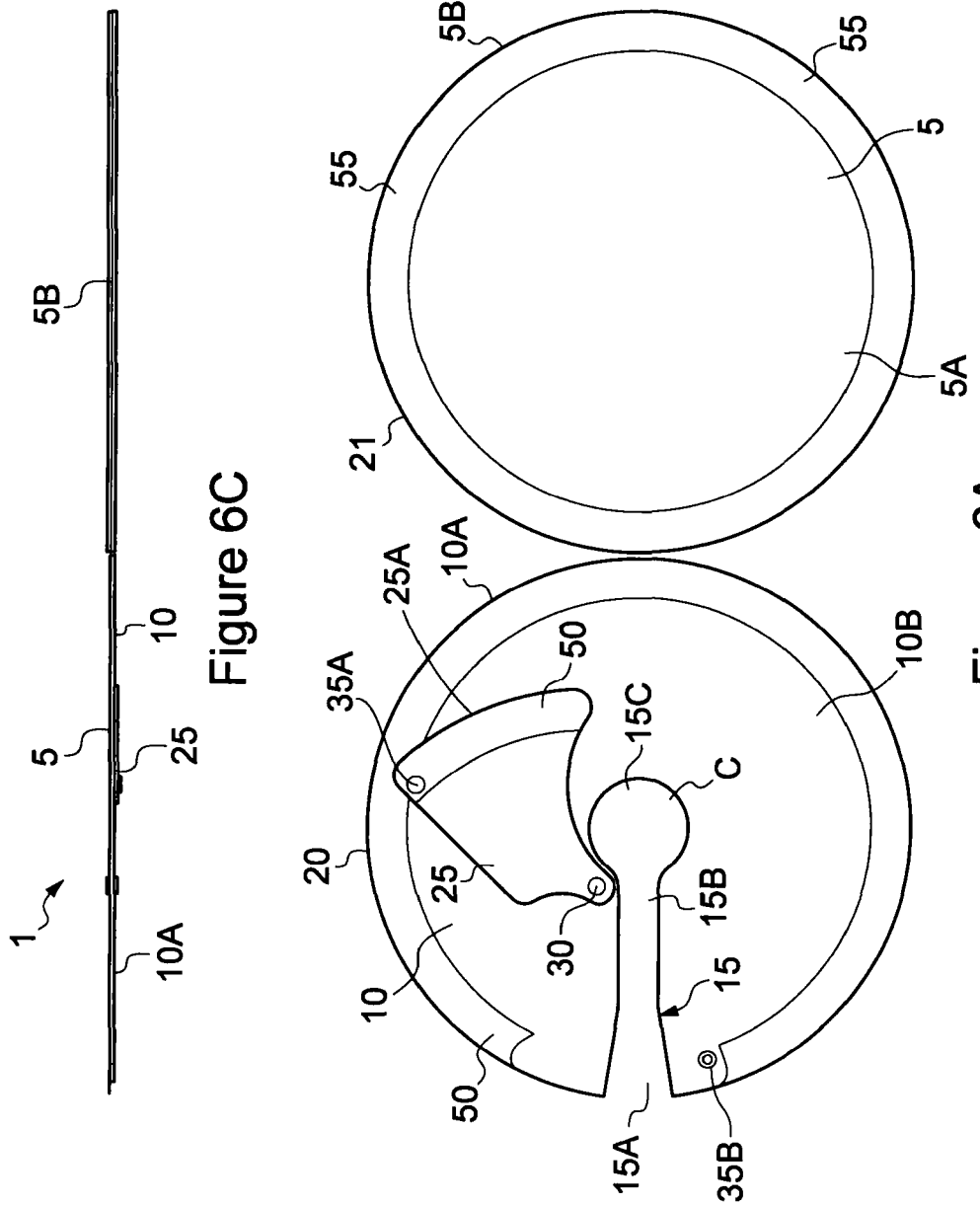

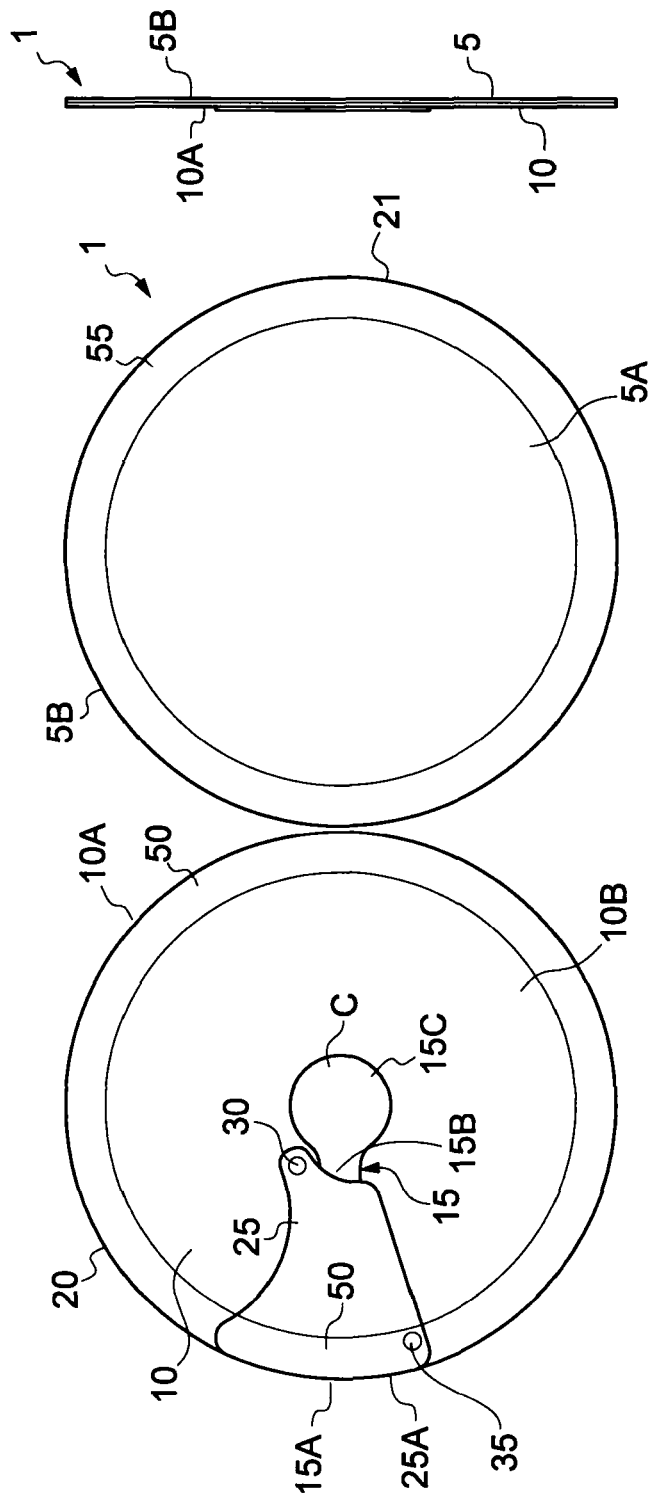

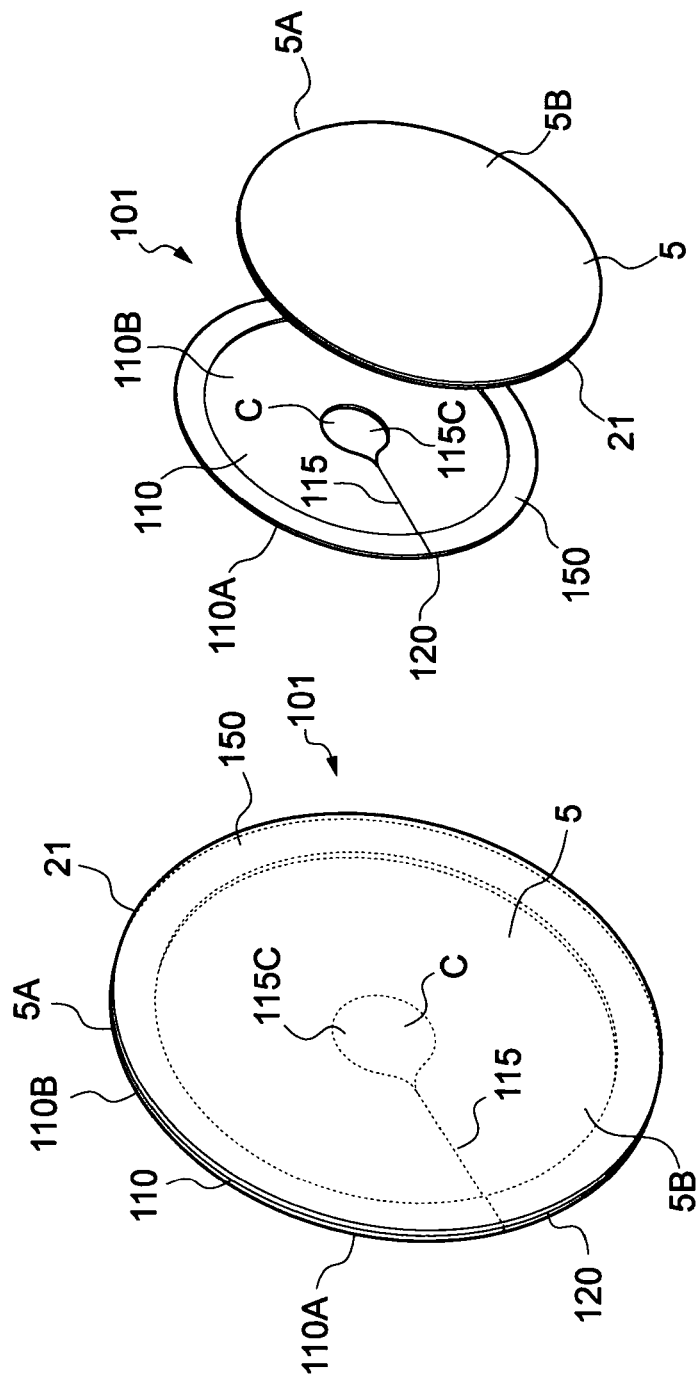

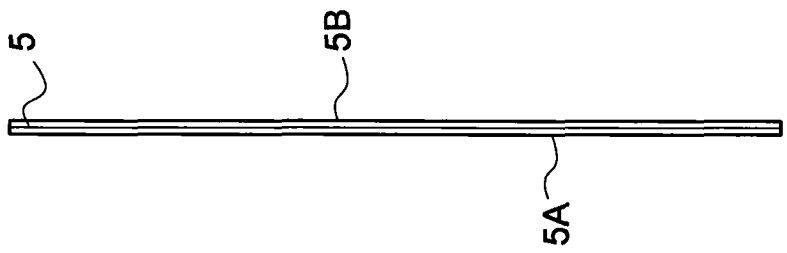
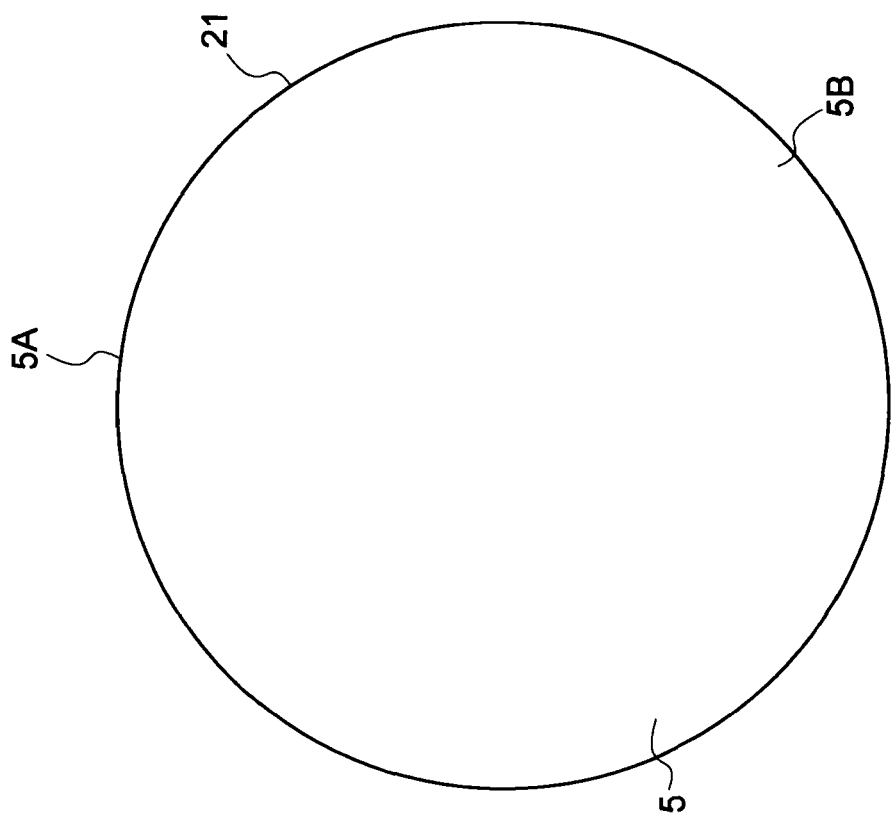

DISC BRAKE PROTECTOR

This invention relates to a disc brake protector for a bicycle, a method of attaching the disc brake protector to a bicycle, and to a bicycle fitted with the disc brake protector.

BACKGROUND

Most bicycles are fitted with a braking system. Such systems generally comprise a brake pad which is pushed against a braking surface on one or both wheels. The friction between the brake pad and the braking surface causes the bicycle to slow down. The force with which the brake pad is pushed against the braking surface is normally generated by a hand-operated brake lever which is generally provided on the handlebars of the bicycle. Thus, by increasing the force provided to the brake lever, the rider of the bicycle can increase the friction between the brake pad and the braking surface and thereby slow the bicycle down more quickly.

There are two main types of braking systems for bicycles. These are known as rim brakes and disc brakes. For a rim brake, the braking surface is a rim on the outer edge of the wheel. In contrast, in a disc brake the axle of the wheel is fitted with a disc which is generally much smaller in diameter than the wheel. This disc then provides the braking surface. In addition to the disc (also referred to as the rotor), a disc brake comprises a calliper and a pair of disc pads. Disc brakes are often preferred because they can provide a higher braking force, as well as more reliable braking in wet weather.

A problem with disc brakes is that they can get damaged when a bicycle is transported. In addition, their performance can be impaired by overspray from chemicals used on other parts of the bicycle. A solution to these problems has been sought.

In the context of the invention, the word "bicycle" is used to refer to a pedal-driven vehicle having two wheels held in a frame one behind the other (ie a "front" and "back" wheel). A bicycle is generally steered with handlebars attached to the front wheel.

STATEMENT OF INVENTION

According to one aspect of the invention, there is provided a disc brake protector for a bicycle, the disc brake protector comprising:
(a) an inner cover for fitting around an axle of a bicycle wheel between the wheel and the disc brake, the inner cover comprising a closable opening for insertion of the axle, and
(b) an outer cover which is attachable to the inner cover such that, in use, the covers enclose the disc brake.

In this way, the entire disc brake (ie disc/rotor, calliper and brake pads) can be encapsulated. In addition, the hydraulic or wire cable which operates the disc brake can be partially covered. The disc brake, particularly the disc/rotor, can therefore be protected from damage during transportation. In addition, the protector can protect the disc brake from contamination during washing and maintenance. A further advantage of the invention is that the wheel of the bicycle can still rotate with the protector fitted around it.

In particular, the inner cover may have an inner side which, in use, faces towards the wheel of the bicycle to which it is attached, and an outer side which, in use, faces away from the when of the bicycle to which it is attached. Similarly, the outer cover may have an outer side which, in use, faces away from the wheel of the bicycle to which it is attached, and an inner side which, in use, faces towards the wheel of the bicycle to which it is attached.

In some embodiments, the inner cover comprises a flexible material. The flexible material may be a plastic. The plastic can be any hard but flexible plastic. In some embodiments, the plastic may be polyvinylchloride, polycarbonate, polypropylene, high impact polystyrene, laminated polyester (for example, two or more sheets of polyester joined by heat/pressure and adhesive), thermoplastic polyurethane, polyurethane, carbon fibre, silicone, polyethylene terephthalate, high-density polyethylene, low-density polyethylene, polystyrene or polycarbonate/acrylonitrile butadiene styrene. In some embodiments, the plastic is polyvinyl chloride. The inner cover may be substantially flat. The inner cover may have a thickness of 0.2-3 mm, preferably 0.3-1 mm.

In some embodiments, the inner cover comprises a substantially circular hole for accepting the axle. The substantially circular hole may be substantially at the centre of the inner cover.

In a first embodiment, the closable opening comprises a channel extending from an outer edge of the inner cover to the substantially circular hole. The channel may comprise a mouth at the edge of the inner cover which initially narrows in the direction of the substantially circular hole. Continuing in a direction from the outer edge to the substantially circular hole, the channel then comprises a section of constant width before reaching the substantially circular hole. The mouth may have a width of 30-45 mm, more particularly 35-40 mm, even more particularly 37-38 mm. In particular, the section of the channel that initially narrows may have a length of 45-60 mm, more particularly 50-55 mm, even more particularly 52-54 mm. The section of constant width may have a width of 15-25 mm, more particularly 18-22 mm, even more particularly around 20 mm. In particular, the section of constant width may have a length of 69-81 mm, more particularly 73-77 mm, even more particularly 74-76 mm. The substantially circular hole may have a radius of around 20-40 mm, more particularly 25-35 mm, even more particularly 28-32 mm.

In the first embodiment, the inner cover may comprise a closure member which is moveable from a first position in which it does not obstruct the channel to a second position in which it closes the channel. The closure member may comprise a plastic. The plastic can be any hard but flexible plastic. In some embodiments, the plastic is polypropylene. The closure member may be substantially flat. The closure member may have a thickness of 0.2-3 mm, preferably 0.3-1 mm.

In some embodiments, the closure member is attached to the inner cover with a rotatable fastener. The rotatable fastener may be a snap fastener such as a popper. In particular, the snap fastener may comprise a first part which is attached to the inner cover, and a second part which is attached to the closure member, the closure member being attached to the inner cover by the mating of the first and second parts. More particularly, the closure member may be attached to the outer side of the inner cover.

The closure member and/or the inner cover may also comprise a releasable fastener for securing the closure member in the second position. The releasable fastener may be a snap fastener such as a popper. In particular, the snap fastener may comprise a first part which is attached to the inner cover, and a second part which is attached to the closure member, the closure member being securable to the inner cover in its second position by the mating of the first and second parts.

In a second embodiment, the closable opening comprises a slit extending from an outer edge of the inner cover to the substantially circular hole. In particular, the slit may have a length of 118-130 mm, more particularly 122-126 mm, even more particularly 123-125 mm. The substantially circular hole may have a radius of around 20-40 mm, more particularly 25-35 mm, even more particularly 28-32 mm.

In some embodiments, the outer cover comprises a flexible material which provides a cushioning effect. For example, the outer cover may comprise a foam such as a polymer foam. The polymer foam can be any flexible polymer foam. In some embodiments, the polymer foam is neoprene. Alternatively, the outer cover may comprise a polyamide fabric (for example a polyamide, polyurethane and elastane fabric such as Schoeller Water-Resistant Breathable Stretch Fabric), a polyurethane coated nylon (for example, 1000 Denier Cordura or Water Resistant PU Coated Nylon Ripstop—hexagon), neoprene coated nylon, a polyester/nylon/polyethylene terephthalate material (for example, X-PAC VX21 Performance Pack Material (Sail material)), polyethylene naphthalate, natural or synthetic leather (for example a quilted leather such as diamond quilted leather), lycra or silicone rubber. The outer cover may be substantially flat. The outer cover may have a thickness of 1-6 mm, preferably 3-5 mm.

In particular, the inner cover and/or the outer cover may be provided with a releasable fastener such that the inner cover can be removably attached to the outer cover. More particularly, the fastener may be a hook and loop fastener. In some embodiments, the hook component of the hook and loop fastener may be provided on one of the inner or outer covers, and the loop component may be provided on the other of the inner or outer covers. For example, the loop component may be provided on the outer side of the inner cover, and the hook component on the inner side of the outer cover. Alternatively, the hook component may be provided on the outer side of the inner cover, and the loop component on the inner side of the outer cover.

The combination of a hook and loop fastener with the materials of the inner and outer covers is particularly useful in the invention because the covers can flex around other components of the bicycle (for example, tubing or cables) with the hook and loop fastener providing a good seal around those components.

In some embodiments, the inner cover and the outer cover are substantially the same shape. In some embodiments, the inner cover and the outer cover are substantially the same size and are substantially circular. The size of the inner and outer covers should be such that, in use, they cover the disc brake of a bicycle. The chosen size of the inner and outer covers may depend upon the type of bicycle to which the protector is being fitted (for example, a road bicycle or a mountain bicycle), their diameters generally being around 235-350 mm. For example, the inner and outer covers may have a diameter of around 280-350 mm, more particularly 300-330 mm, even more particularly 310-320 mm. Alternatively, the inner and outer covers may have a diameter of around 235-305 mm, more particularly 255-285 mm, even more particularly 265-275 mm In an embodiment where the inner and outer covers are substantially the same shape, or are substantially the same size and are substantially circular, the hook and loop fastener may be provided around the outer edge of the inner and outer covers. The thickness of the hook and loop components (ie the distance that they extend inwardly from the outer edge of the inner and outer covers) may be around 10-70 mm, more particularly 15-65 mm, even more particularly 20-60 mm.

According to a second aspect of the invention, there is provided a method of attaching a disc brake protector as described above to a bicycle, the method comprising the steps of:
(a) sliding the inner cover between a wheel of the bicycle and a disc brake of the bicycle, such that an axle of the bicycle wheel is inserted into the closable opening, and
(b) attaching the outer cover to the inner cover such that the disc brake is enclosed by the outer and inner covers.

In a first embodiment, the inner cover may comprise a substantially circular hole for accepting the axle, the closable opening comprises a channel extending from an outer edge of the inner cover to the substantially circular hole, and a closure member which is moveable from a first position in which it does not obstruct the channel to a second position in which it closes the channel, and step (a) may additionally comprise sliding the axle along the channel such that it is accepted by the substantially circular hole and then moving the closure member to the second position.

In some embodiments, the closure member and/or the inner cover may also comprise a releasable fastener for securing the closure member in the second position, and step (a) may comprise closing the fastener in order to secure the closure member in the second position. More particularly, the releasable fastener may be a snap fastener such as a popper. In particular, the snap fastener may comprise a first part which is attached to the inner cover, and a second part which is attached to the closure member, and step (a) may comprise mating the first and second parts in order to secure the closure member in the second position.

In the second embodiment, the inner cover may comprise a substantially circular hole for accepting the axle and the closable opening may comprise a slit extending from an outer edge of the inner cover to the substantially circular hole, and wherein step (a) additionally comprises opening the slit prior to inserting the axle, and sliding the axle along the slit such that it is accepted by the substantially circular hole.

In some embodiments, the inner and outer covers may be provided with first and second parts of a hook and loop fastener such that the inner cover can be attached to the outer cover, and step (b) may comprise attaching the first part of the hook and loop fastener to the second part.

According to a third aspect of the invention, there is provided a bicycle fitted with a disc brake protector as described above.

BRIEF DESCRIPTION OF THE DRAWINGS

This invention will be further described by reference to the following Figures which are not intended to limit the scope of the invention claimed, in which:

FIG. 1 shows a perspective view of a disc brake protector according to a first embodiment of the invention, FIG. 2 shows an exploded perspective view of the disc brake protector of FIG. 1, FIGS. 3A and 3B show plan and side-on views of the outer cover of the disc brake protector of FIG. 1, FIGS. 4A and 4B show plan and side-on views of the inner cover of the disc brake protector of FIG. 1, FIG. 6A shows a plan view of the sides of the outer and inner covers of the disc brake protector of FIG. 1 which are attached to each other in use, the closure member being in a first, open position, FIGS. 6B and 6C show side-on and end-on views of the disc brake protector of FIG. 1 with the closure member in a first, open position, FIG. 7A shows a plan view of the sides of the outer and inner covers of the disc brake protector of FIG. 1 which are attached to each other in use, the closure member being in a second, closed position, FIGS. 7B and 7C show side-on and end-on views of the disc brake protector of FIG. 1 with the closure member in a second, closed position, FIG. 10 shows a perspective view of a disc brake protector according to a second embodiment of the invention, FIG. 11 shows an exploded perspective view of the disc brake protector of FIG. 10, FIGS. 12A and 12B show plan and side-on views of the outer cover of the disc brake protector of FIG. 10, FIGS. 13A-13C show plan, side-on and end-on views of the inner cover of the disc brake protector of FIG. 10, FIGS. 14A-14G show a method of attaching the disc brake protector of FIG. 10 to a rear wheel of a bicycle.

DETAILED DESCRIPTION

Figure 5:
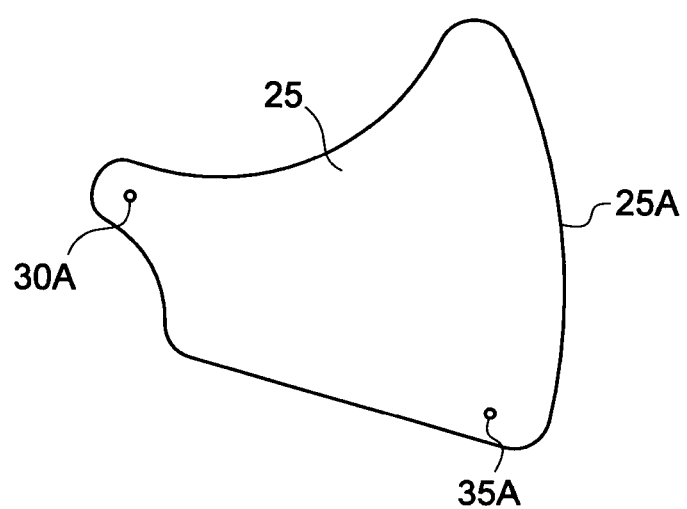
FIG. 5 shows a plan view of the closure member of the disc brake protector of FIG. 1.

FIGS. 1-7C show a disc brake protector 1 according to a first embodiment of the invention. The disc brake protector 1 comprises a substantially flat, substantially circular outer cover 5, and a substantially flat, substantially circular inner cover 10. The outer cover 5 is normally formed from a flexible polymer foam such as neoprene. In this embodiment, the outer cover 5 has a diameter of 315 mm and a thickness of 2.5 mm. Inner cover 10 is usually formed from a hard but flexible plastic such as polypropylene. In this embodiment, the inner cover 10 has a diameter of 315 mm (ie the same as the outer cover) and a thickness of 0.4 mm.

As shown in FIGS. 1, 2, 4A, 6A and 7A, inner cover 10 is provided with a slot 15 extending from the outer edge 20 of the inner cover 10 to the centre C of inner cover 10. The slot 15 is shaped such that it has an opening 15A which initially narrows as the slot 15 extends towards centre C. The opening 15A has a width of 37.71 mm, which narrows to a width of 20 mm over an inward distance (ie length) of 52.8 mm. Progressing along the slot 15 towards centre C, there is then provided a section 15B of constant width. The section 15B of constant width has a width of 20 mm and a length of 74.7 mm. Moving further towards the centre C, the section 15B of constant width reaches substantially circular section 15C. Substantially circular section 15C has a radius of 30 mm. As described in more detail below, the shaping of slot 15 in this way assists the user when sliding the inner cover 10 onto the axle of a bicycle wheel.

Inner cover 10 has an inner side 10A which in use faces towards the wheel of the bicycle to which it is attached. In addition, inner cover 10 has an outer side 10B which in use faces away from the wheel of the bicycle to which it is attached. As shown in FIGS. 1, 2, 4A, 6A and 7A, extending around most of the outer edge 20 of the outer side 10B of inner cover 10 is a first part 50 of a hook and loop fastening system (eg Velcro®). Normally, the hook part is attached to inner cover 10. The first part 50 of the hook and loop fastening system extends 27 mm inwardly from the outer edge 20.

Similarly, outer cover 5 has an inner side 5A which in use faces towards the wheel of the bicycle to which it is attached. In addition, outer cover 5 has an outer side 5B which in use faces away from the wheel of the bicycle to which it is attached. As shown in FIGS. 6A and 7A, a second part 55 of a hook and loop fastening system extends around an outer edge 21 of the inner side 5A of outer cover 5. Normally, the loop part is attached to outer cover 5. The second part 55 of the hook and loop fastening system extends 27 mm inwardly from the outer edge 21.

As shown in FIGS. 1, 2 and 6A-7C, also attached to the outer side 10B of the inner cover 10 is closure member 25. A view of the closure member 25 prior to attachment to inner cover 10 is shown in FIG. 5, this view being of the side which in use faces towards the wheel of the bicycle to which it is attached. Closure member 25 is substantially flat and is also formed from a hard but flexible plastic such as polypropylene. Closure member 25 has the same thickness as inner cover 10. Closure member 25 is attached to inner cover 10 close to the transition of slot 15 from section 15B of constant width to substantially circular section 15C. This attachment is such that the closure member 25 can pivot about the point of attachment, and can for example be provided by a snap fastener such as first popper 30. Such poppers generally comprise a first (eg female) part 30A, which in this case is attached to the closure member 25, and a second (eg male) part 30B, which in this case is attached to the inner cover 10. The popper 30 has a diameter of 12 mm and a thickness of 9 mm. The closure member 25 is generally wedge-shaped, with the attachment that allows the pivoting of closure member 25 being close to a narrow end of the wedge-shape. The wide end of the wedge shape has a width of 122 mm.

In this way, the closure member 25 is rotatable from a first position in which it does not obstruct slot 15 (see, for example FIGS. 6A-6C), to a second position in which it obstructs or closes slot 15 (see, for example, FIGS. 1, 2, 7A-7C). As discussed in more detail below, moving the closure member 25 to its second position secures the inner cover 10 to axle of a bicycle.

Inner cover 10 is also provided with a second part 35B of a second popper 35 at a position close to outer edge 20 and opening 15A of slot 15. A corresponding first part 35A of popper 35 may be provided on closure member 25 such that when the closure member 25 is in its second position the first 35A and second 35B parts align and can be fastened together. Again, the popper 35 has a diameter of 12 mm and a thickness of 9 mm. Popper 35 is provided on the wide end of the closure member 25. In this way, closure member 25 can be secured in its second position.

Closure member 25 may additionally be provided with the same first part 50 of the hook and loop fastening system of inner cover 10. This is arranged along outer edge 25A of closure member 25 on the side of closure member 25 that, in use, faces away from the wheel of the bicycle to which it is attached. Again, this first part 50 of the hook and loop fastening system extends 27 mm inwardly from the outer edge 25A of closure member 25. This outer edge 25A lines up with outer edge 20 of inner cover 10 when closure member 25 is in its second position (see FIG. 7A) such that there is provided a substantially continuous section of the first part of the hook and loop fastening system around the outer edge 20 of inner cover 10.

The process of attaching the disc brake protector 1 to a rear wheel 205 of a bicycle 200 is shown in FIGS. 8A-8H. In most of these Figures, only the main component parts of the disc brake protector 1 are labelled, ie the outer cover 5, the inner cover 10 and the closure member 25. The slot 15 is also labelled in FIG. 8A. The rear wheel 205 is attached to the frame 215 of the bicycle 200 by a central axle 210. A disc brake 220 is also fitted to axle 210.

Figure 8B:
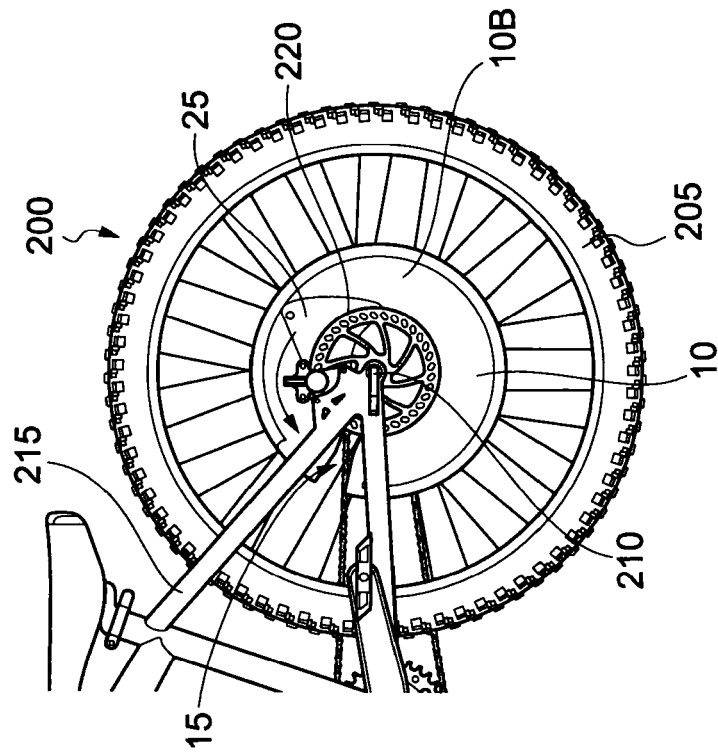
FIGS. 8A-8H show a method of attaching the disc brake protector of FIG. 1 to a rear wheel of a bicycle.
Figure 8A:
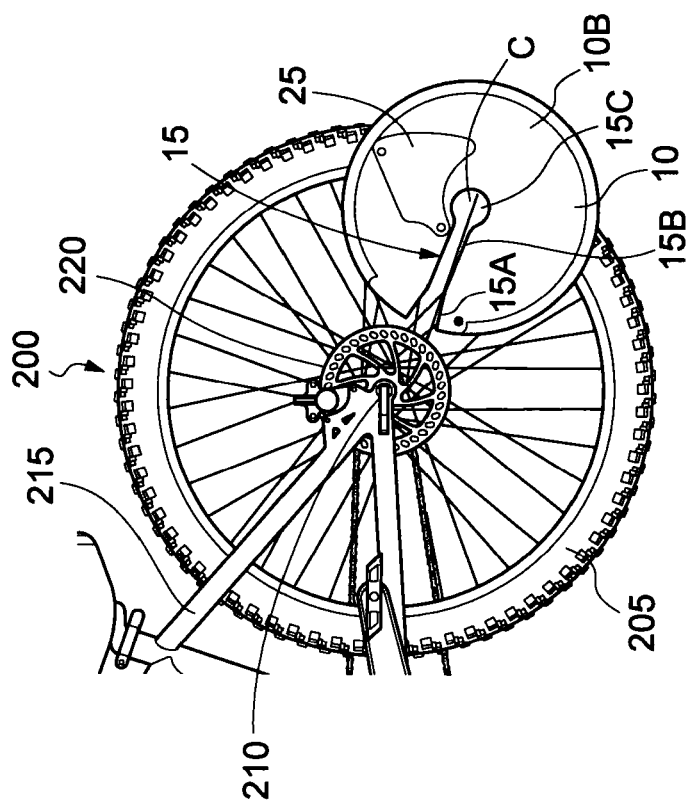
Figure 8D:
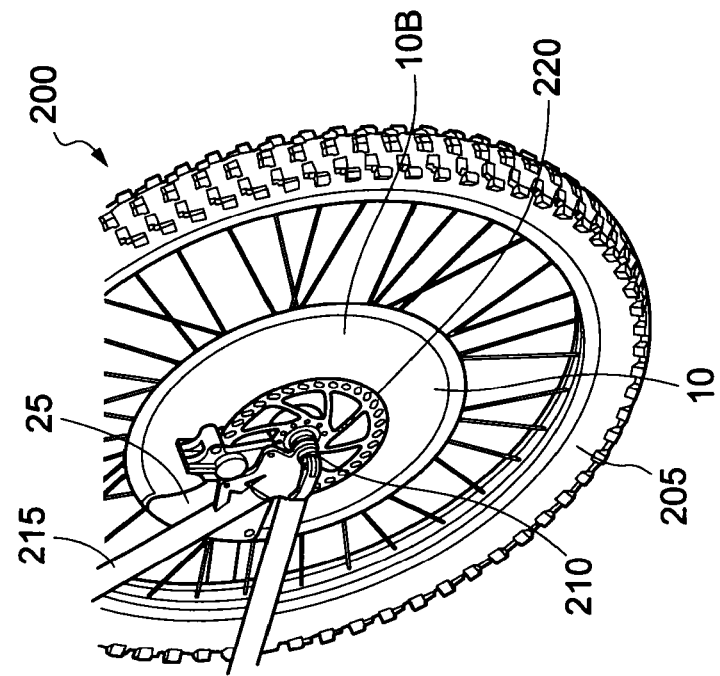

As shown in FIG. 8A, the inner cover 10 is attached first. The closure member 25 is put in its first, open position. The inner cover 10 is then slid over the axle 210 of the rear wheel 205 such that the axle 210 enters the opening 15A of slot 15, moves along the section 15B of constant width and is accepted into the substantially circular section 15C. Thus, the inner cover 10 is positioned between the rear wheel 205 and the disc brake 220, the inner side 10A facing the rear wheel 205 of the bicycle 200 and the outer side 10B facing the disc brake 220.

Figure 8C:
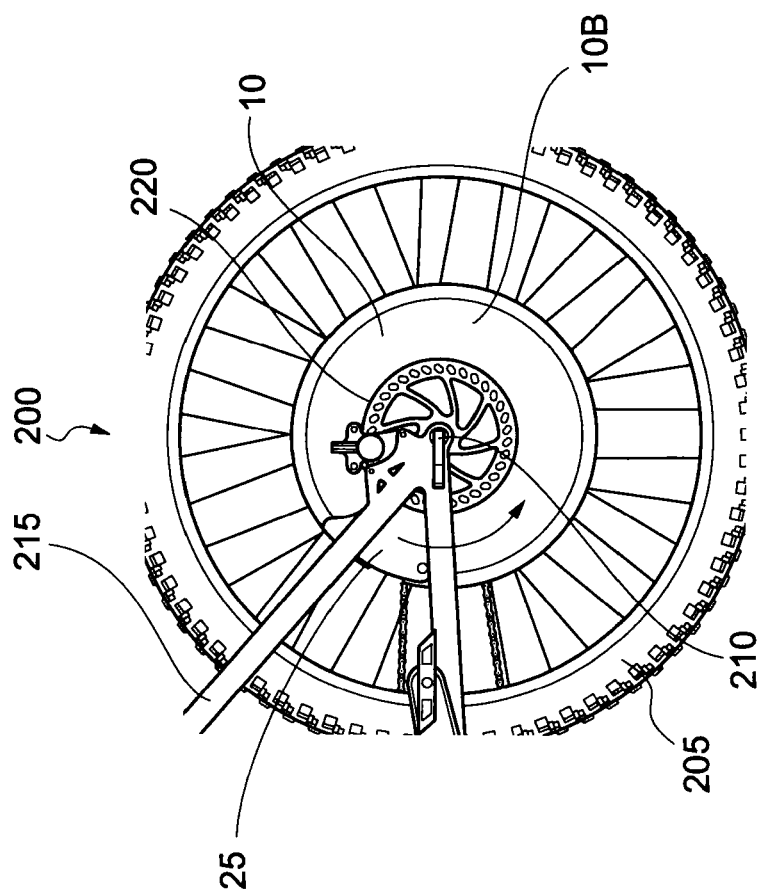

As indicated by the arrow in FIGS. 8B and 8C, the closure member 25 is then rotated from its first, open position (see FIG. 8B) to its second, closed position (see FIG. 8C). As shown by the arrow in FIG. 8D, the closure member 25 is secured in this position by closing the first part 35A of popper with its second part 35B. In this way, the inner cover 10 is secured to the bicycle 200. FIG. 8E depicts a reverse view of that shown in FIG. 8D, clearly showing how the inner side 10A of inner cover 10 faces the rear wheel 205 of bicycle 200.

Figure 8F:
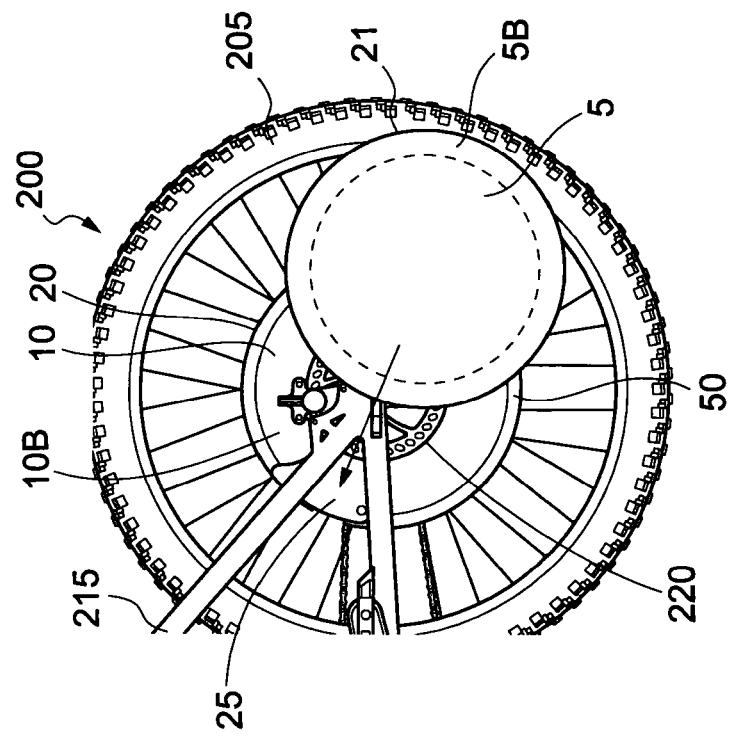
Figure 8E:
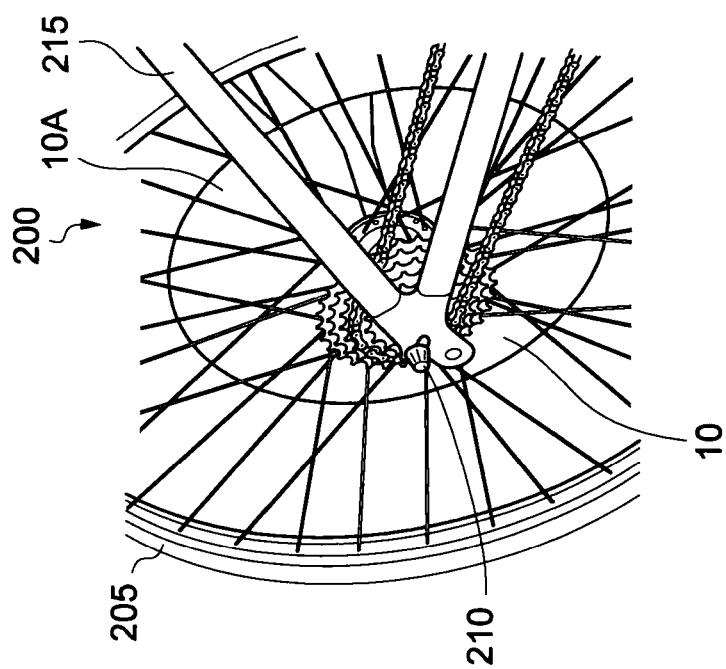
Figure 8H:
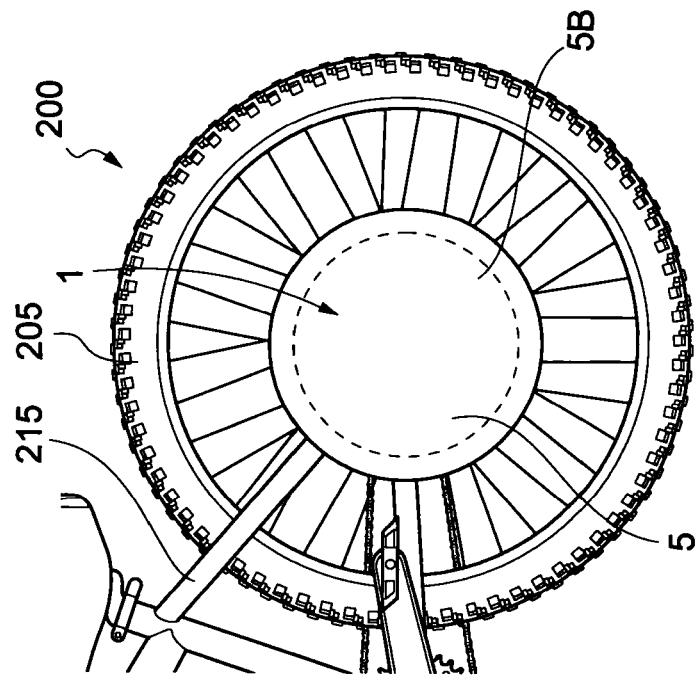
Figure 8G:
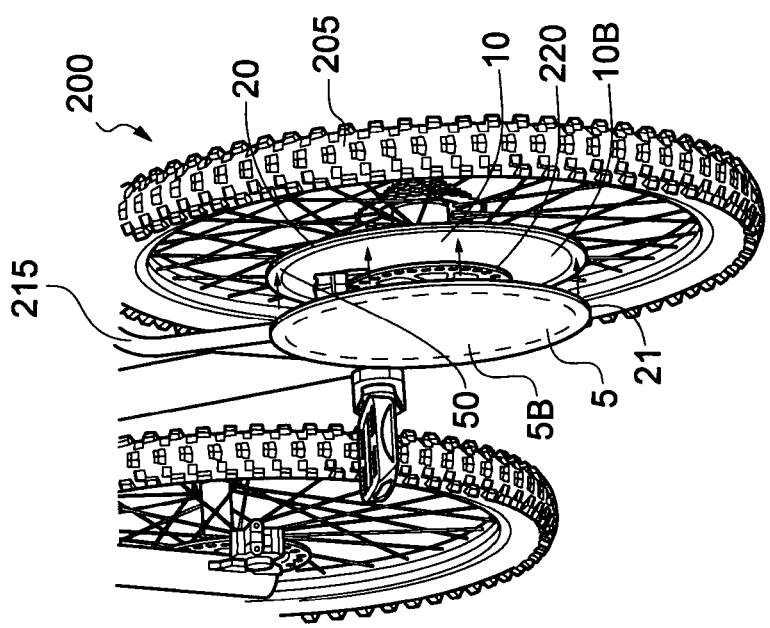

FIGS. 8F-8H then depict the attachment of the outer cover 5 to the inner cover 10. As shown in FIGS. 8F and 8G, outer cover 5 is lined up with inner cover 10 such that the outer edge 21 of outer cover 5 is substantially aligned with the outer edge 20 of inner cover 10. Outer cover 5 is positioned such that outer side 5B faces away from the rear wheel 205 of the bicycle 200, and inner side 5A faces towards the rear wheel 205 of the bicycle 200. The outer cover 5 is then pressed onto inner cover 10 such that the first part 50 of the hook and loop fastening system on inner cover 10 attaches to the second part 55 of the hook and loop fastening system on outer cover 5. The position of the inner edge of the second part 55 of the hook and loop fastening system on the inner side 5A (ie the side facing towards the rear wheel 205 of bicycle 200) of outer cover 5 is indicated by the dashed circle in FIGS. 8F-9. Thus, the inner 10 and outer 5 covers are attached to each other as shown in FIG. 8H to form the disc brake protector 1 and the disc brake is therefore protected, for example during transit. An advantage of using a hook and loop fastening system is that it can secure the disc brake protector 1 tightly around the frame 215 of the bicycle, whilst allowing parts of the frame to exit the disc brake protector 1.

Figure 9:
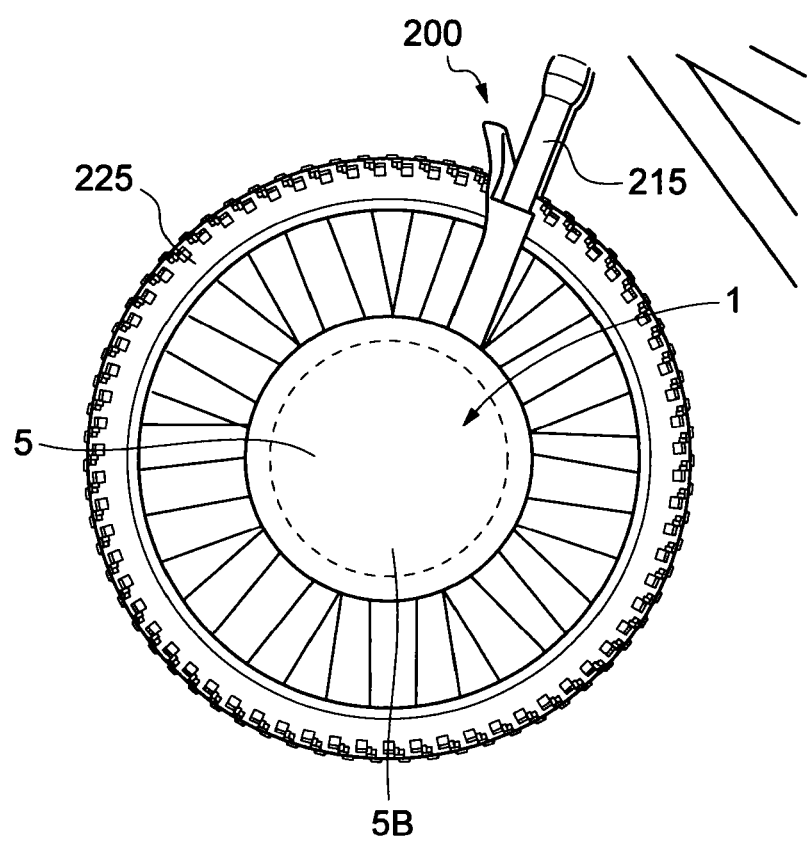
FIG. 9 shows the disc brake protector of FIG. 1 when attached to a front wheel of a bicycle.

FIG. 9 shows a similar view to FIG. 8H except that the disc brake protector 1 is attached to a front wheel 225 of a bicycle 200. The method of attachment is otherwise identical to that shown in FIGS. 8A-8H.

FIGS. 10-13C depict a disc brake protector 101 according to a second embodiment of the invention. The disc brake protector 101 comprises an outer cover 5 which is identical to that of the disc brake protector 1 of the first embodiment. The disc brake protector 101 of the second embodiment differs from the first embodiment 1 in that the inner cover 110 (indicated in dashed lines in FIG. 10) does not include a closure member 25 and is shaped differently to the inner cover 10. In this embodiment, the inner cover 110 has a diameter of 315 mm and a thickness of 0.4 mm.

As shown in FIGS. 10, 11 and 13A-13B, inner cover 110 does not include a closure member 25, popper 30 or popper 35. Also, instead of being provided with a slot 15, inner cover 110 comprises slit 115 which extends from an outer edge 120 of the inner cover 110 towards the centre C of inner cover 110. Slit 115 is in the form a cut through the inner cover 110. Slit 115 extends inwardly from outer edge 120 a distance (ie length) of 124.17 mm. As the slit 115 approaches centre C it opens up to form substantially circular section 115C. Substantially circular section 115C has a radius of 30 mm. As described in more detail below, the shaping of slit 115 in this way assists the user when sliding the inner cover 110 onto the axle of a bicycle wheel.

Figure 13C:
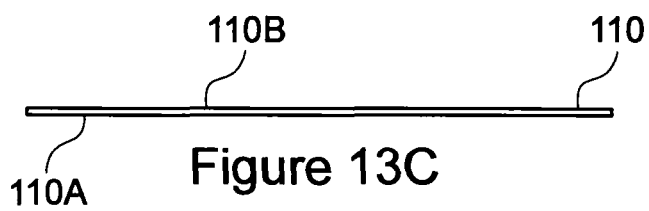
Figure 13A:
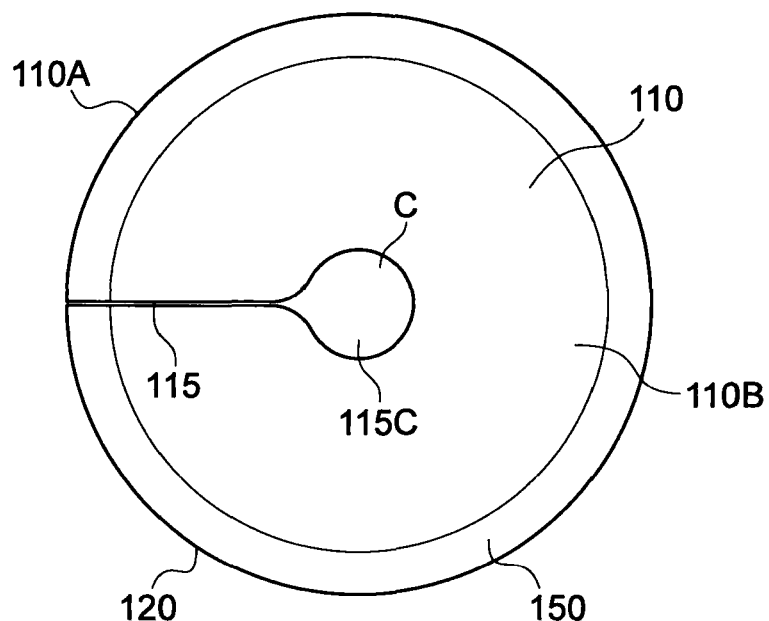
Figure 13B:
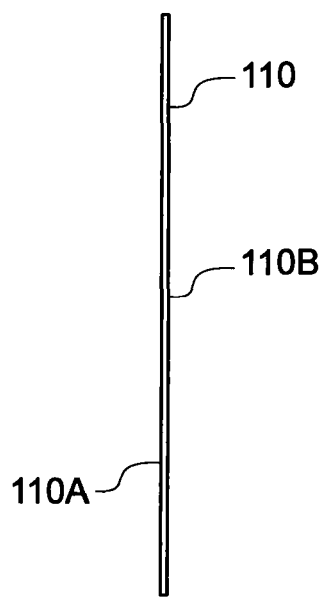

Inner cover 110 is otherwise identical to inner cover 10 of the first embodiment 1. Inner cover 110 has an inner side 110A which in use faces towards the wheel of the bicycle to which it is attached. In addition, inner cover 110 has an outer side 110B which in use faces away from the wheel of the bicycle to which it is attached. As shown in FIGS. 10, 11 and 13A, extending around most of the outer edge 120 of the outer side 110B of inner cover 110 is a first part 150 of a hook and loop fastening system (eg Velcro®). Normally, the hook part is attached to inner cover 110. The first part 150 of the hook and loop fastening system extends 27 mm inwardly from the outer edge 120.

The process of attaching the disc brake protector 100 of the second embodiment to a rear wheel 205 of a bicycle 200 is shown in FIGS. 14A-14G. In most of these Figures, only the main component parts of the disc brake protector 101 are labelled, ie the outer cover 5 and the inner cover 110. The slit 115 is also labelled in FIGS. 14A-14C. The rear wheel 205 is attached to the frame 215 of the bicycle 200 by a central axle 210. A disc brake 220 is also fitted to axle 210. The rear wheel 205 is attached to the frame 215 of the bicycle 200 by a central axle 210. A disc brake 220 is also fitted to axle 210.

Figure 14B:
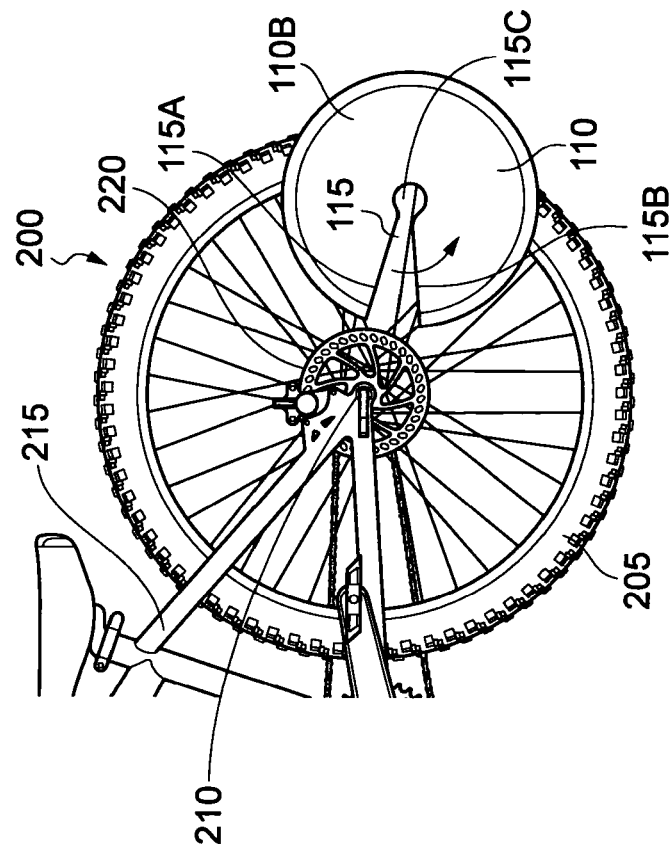
Figure 14A:
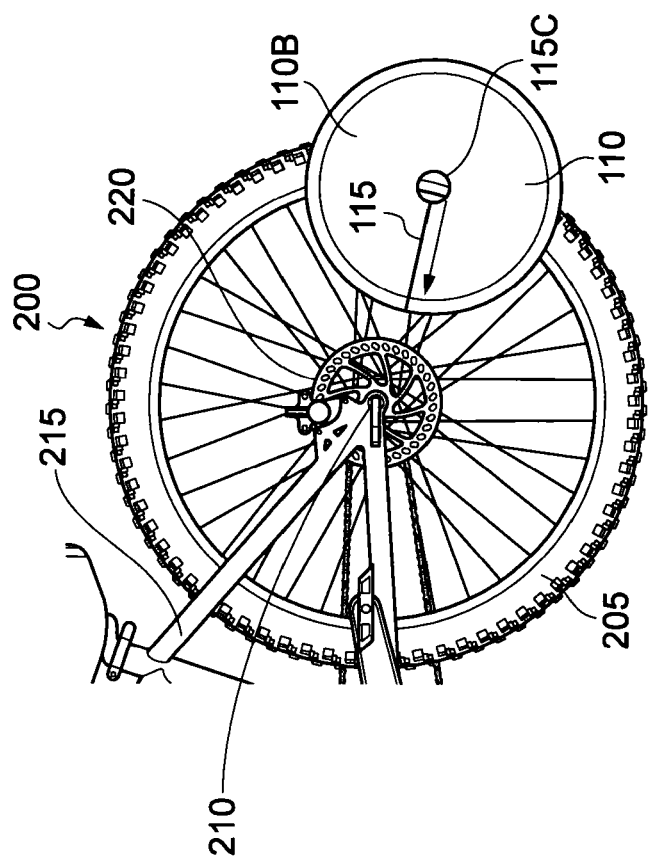

As shown in FIG. 14A, the inner cover 110 is attached first. This slit 115 is lined up with the axle 210. Then, as depicted in FIG. 14B, the inner cover 110 is twisted which distorts the plastic such that edges 115A and 115B of slit 115 are moved apart from each other. The inner cover 110 is then slid over the axle 210 of the rear wheel 205 such that the axle 210 enters the gap formed between edges 115A and 115B of slit 115 and is accepted into the substantially circular section 115C. Thus, the inner cover 110 is positioned between the rear wheel 205 and the disc brake 220, the inner side 110A facing the rear wheel 205 of the bicycle 200 and the outer side 110B facing the disc brake 220.

Figure 14D:
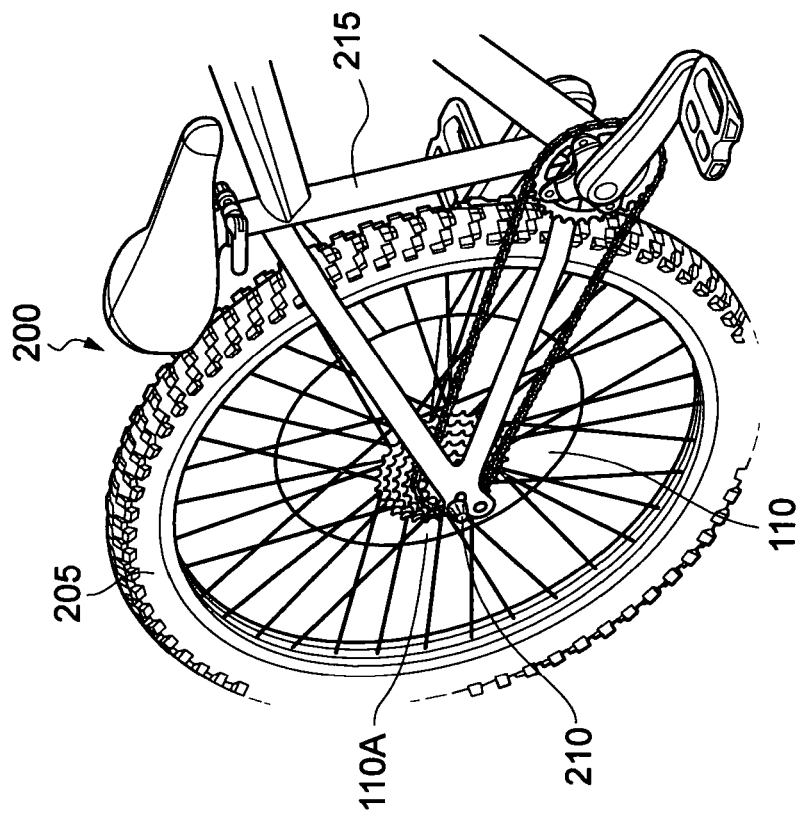
Figure 14C:
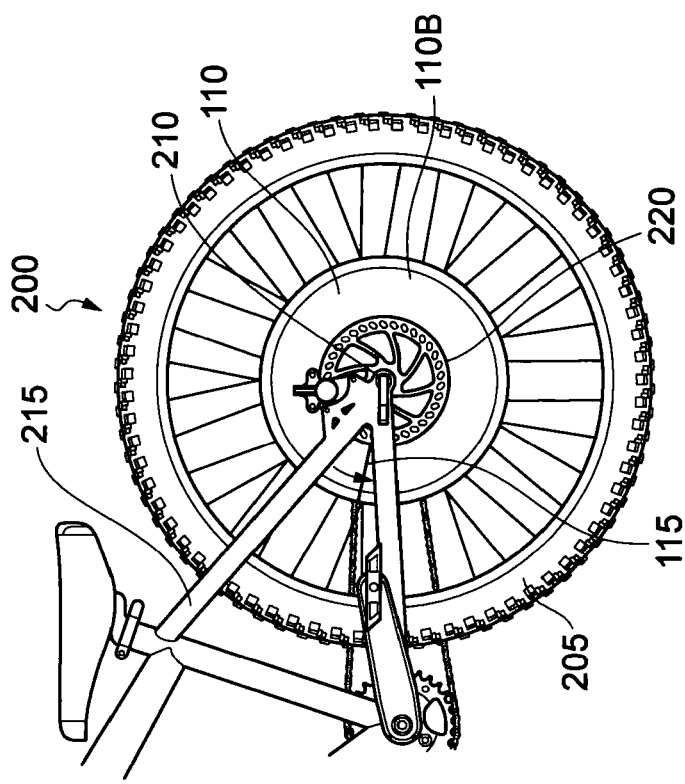

As indicated by the arrow in FIG. 14C, the inner cover 110 is then allowed to return to its original shape such that the gap between the edges 115A and 115B of slit 115 is closed. FIG. 14D depicts a reverse view which corresponds to that shown in FIG. 8E, clearly showing how the inner side 110A of inner cover 110 faces the rear wheel 205 of bicycle 200.

Figure 14F:
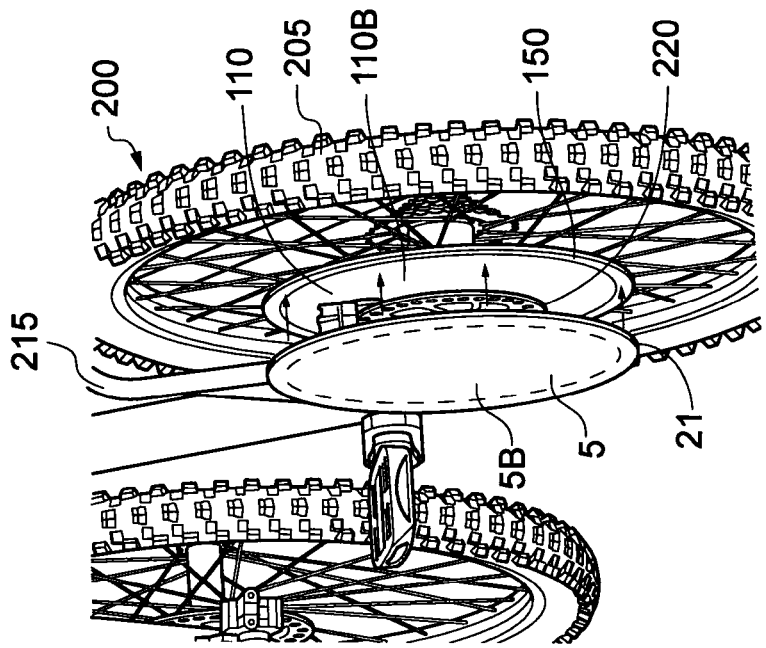
Figure 14E:
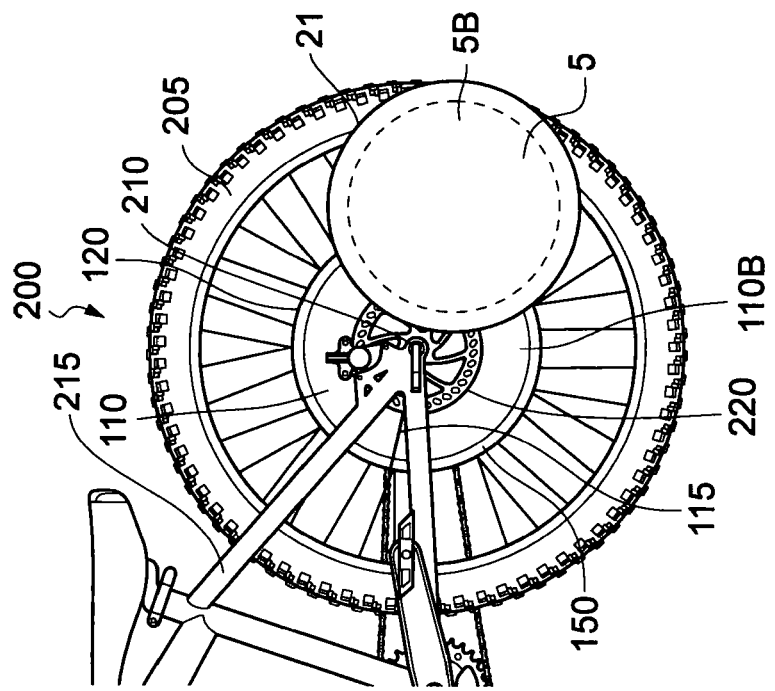
Figure 14G:
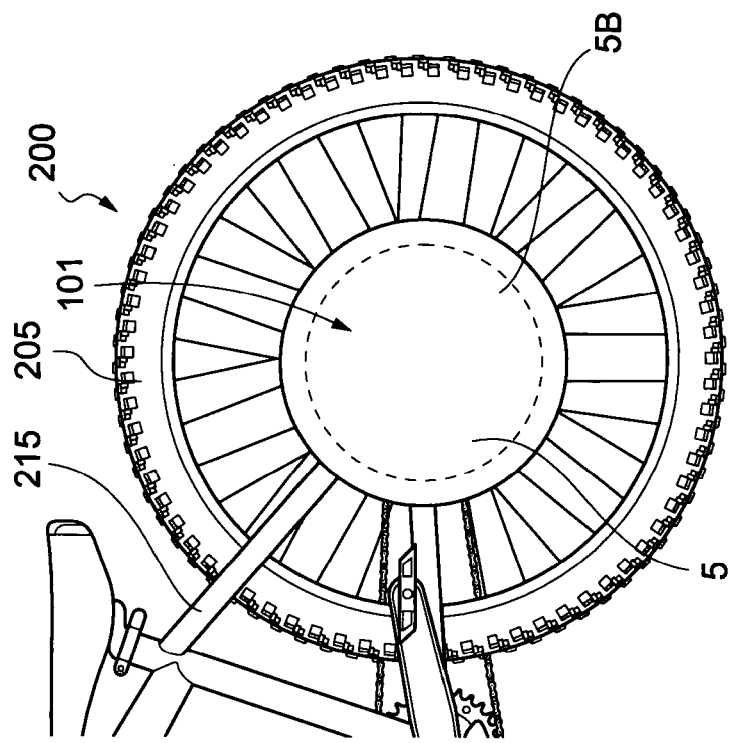

FIGS. 14E-14G then depict the attachment of the outer cover 5 to the inner cover 110. The process is identical to that described in relation to FIGS. 8F-8H regarding the first embodiment. As shown in FIGS. 14E and 14F, outer cover 5 is lined up with inner cover 110 such that its outer edge 21 is substantially aligned with the outer edge 120 of inner cover 110. The outer cover 5 is then pressed onto inner cover 110 such that the first part 150 of the hook and loop fastening system on inner cover 110 attaches to the second part 155 of the hook and loop fastening system on outer cover 5. The position of the inner edge of the second part 155 on the inner side 5A (ie the side facing towards the rear wheel 205 of bicycle 200) of outer cover 5 is indicated by the dashed circle in FIGS. 14E-15. Thus, the inner 110 and outer 5 covers are attached to each other as shown in FIG. 14G and the disc brake is therefore protected.

Figure 15:
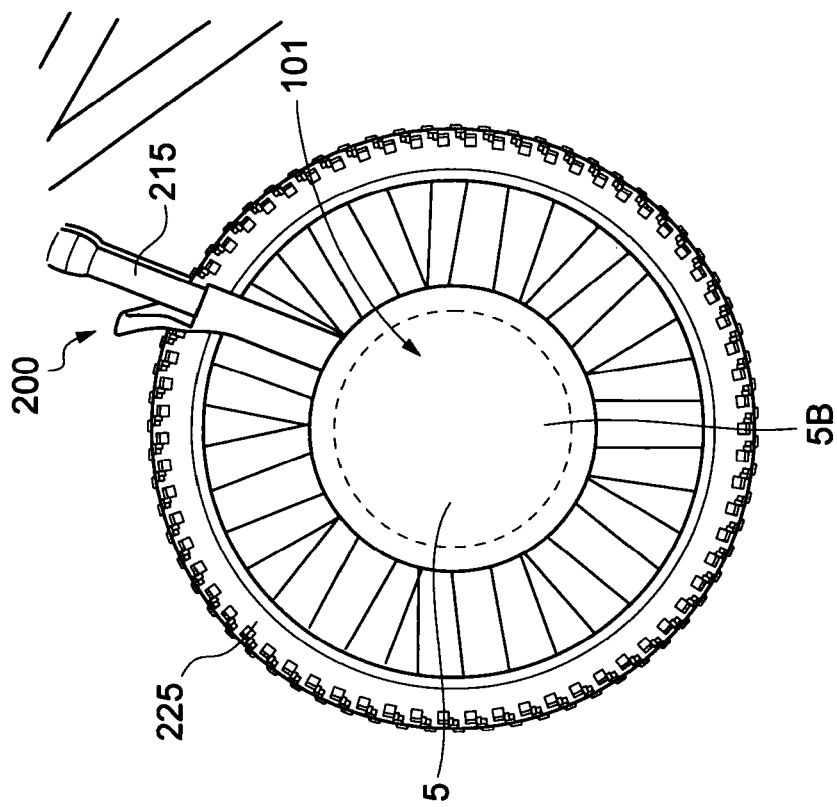
FIG. 15 shows the disc brake protector of FIG. 10 when attached to a front wheel of a bicycle.

FIG. 15 shows a similar view to FIG. 9, with the disc brake protector 101 attached to a front wheel 225 of a bicycle 200. The method of attachment is otherwise identical to that shown in FIGS. 14A-14G.

The invention claimed is:

1. A disc brake protector, the disc brake protector comprising:
   (a) an inner cover for fitting around an axle of a wheel between the wheel and the disc brake, the inner cover comprising a closable opening for insertion of the axle;
   (b) an outer cover attachable to the inner cover such that, in use, the inner and outer covers enclose the disc brake; and
   wherein the inner cover and the outer cover comprise a first part and a second part of a hook-and-loop fastener such that the inner cover may be removably attached to the outer cover.

2. The disc brake protector as claimed in claim 1, wherein the inner cover comprises a flexible material.

3. The disc brake protector as claimed in claim 2, wherein the flexible material is a plastic.

4. The disc brake protector as claimed in claim 1, wherein the inner cover is substantially flat.

5. The disc brake protector as claimed in claim 1, wherein the inner cover has formed therein a substantially circular hole for accepting the axle.

6. The disc brake protector as claimed in claim 5, wherein the closable opening comprises a slit extending from an outer edge of the inner cover to the substantially circular hole.

7. The disc brake protector as claimed in claim 5, wherein the closable opening comprises a channel extending from an outer edge of the inner cover to the substantially circular hole.

8. The disc brake protector as claimed in claim 7, wherein the inner cover comprises a closure member moveable from a first position in which the closure member does not obstruct the channel to a second position in which the closure member closes the channel.

9. The disc brake protector as claimed in claim 8, wherein the closure member is attached to the inner cover with a rotatable fastener.

10. The disc brake protector as claimed in claim 7, wherein the closure member and/or the inner cover comprises a releasable fastener for securing the closure member in the second position.

11. The disc brake protector as claimed in claim 1, wherein the outer cover comprises a flexible material that provides a cushioning effect.

12. The disc brake protector as claimed in claim 11, wherein the flexible material is a polymer foam.

13. The disc brake protector as claimed in claim 1, wherein the inner cover and the outer cover are substantially the same size and are substantially circular.

14. A method of attaching a disc brake protector as claimed in claim 1 to a bicycle, the method comprising:
   (a) sliding the inner cover between a wheel of the bicycle and a disc brake of the bicycle, such that an axle of the bicycle wheel is inserted into the closable opening; and
   (b) attaching the outer cover to the inner cover using the first part and the second part of the hook and loop fastener such that the disc brake is enclosed by the outer and inner covers.

15. The method as claimed in claim 14, wherein the inner cover comprises a substantially circular hole for accepting the axle and the closable opening comprises a slit extending from an outer edge of the inner cover to the substantially circular hole, and wherein step (a) additionally comprises opening the slit prior to inserting the axle, and sliding the axle along the slit such that it is accepted by the substantially circular hole.

16. The method as claimed in claim 14, wherein the inner cover comprises a substantially circular hole for accepting the axle, the closable opening comprises a channel extending from an outer edge of the inner cover to the substantially circular hole, and a closure member which is moveable from a first position in which it does not obstruct the channel to a second position in which it closes the channel, and wherein step (a) additionally comprises sliding the axle along the channel such that it is accepted by the substantially circular hole and then moving the closure member to the second position.

17. A bicycle fitted with a disc brake protector as claimed in claim 1.

* * * * *